No. 848,819. PATENTED APR. 2, 1907.
C. A. FREEMAN.
BUSHING COUPLING.
APPLICATION FILED NOV. 27, 1906.
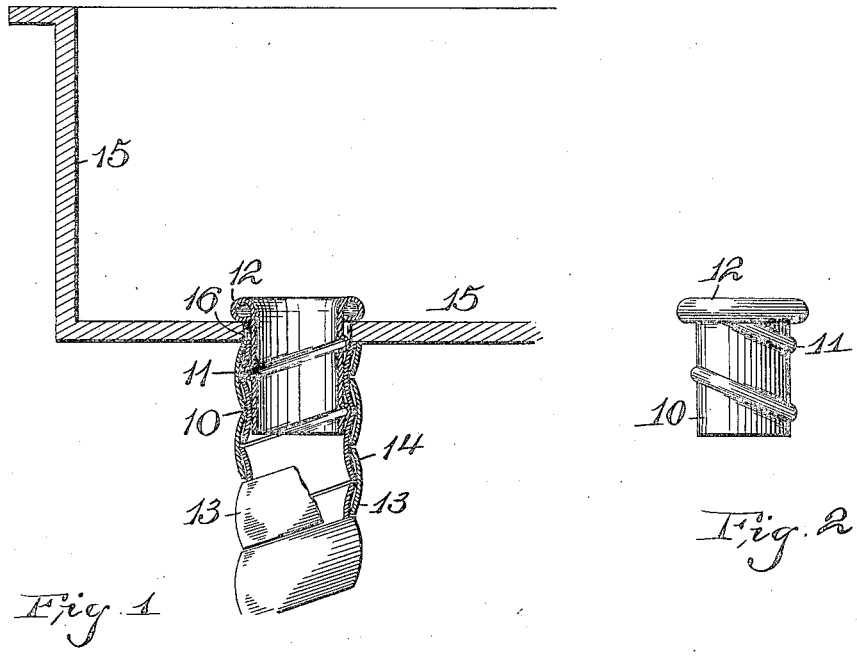
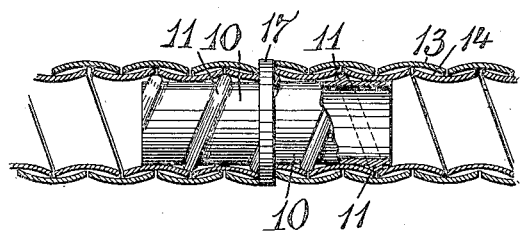
WITNESSES:
E. A. Pell
R. Johnson
INVENTOR
Charles A. Freeman
BY
Wm. H. Canfield
ATTORNEY.

UNITED STATES PATENT OFFICE.

CHARLES A. FREEMAN, OF EAST ORANGE, NEW JERSEY.

BUSHING-COUPLING.

No. 848,819.          Specification of Letters Patent.          Patented April 2, 1907.

Application filed November 27, 1906. Serial No. 345,299.

*To all whom it may concern:*

Be it known that I, CHARLES A. FREEMAN, a citizen of the United States, residing at East Orange, in the county of Essex and State of New Jersey, have invented certain new and useful Improvements in Bushing-Couplings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a device that can be used as a bushing for electrical conduits, as a coupling between two ends of conduits, and also used to couple the ends of conduits to a conduit-box.

As previously coupled or provided with bushings the conduits are cut off and are provided with a lead or similar soft bushing, and they are then fastened up against a conduit-box or another conduit by the assistance of another mechanism. This present style of lead bushings are very soft, and when they become bent or mutilated inside they form a serious obstruction to the installation of wires or cables through the conduits. This invention is designed to provide an article of this kind, however, which is made of rigid metal, such as brass, and is adapted not to lose its shape, and forms a ready means for coupling a conduit to another element.

In the drawings, Figure 1 is a sectional view showing a conduit coupled to a box, and Fig. 2 is an elevation of the coupling. Fig. 3 is a broken section of a coupling used to connect two ends of conduits.

I provide in this device a tubular member 10, which is preferably made of a stiff rigid metal and can be cast; but I prefer to stamp or spin it from sheet metal. The tubular member is provided with a raised portion forming a thread 11, and on the device shown in Fig. 1 I form a flange or turned-over portion 12, and in case the device is made of sheet metal it is curled over to make it stiff to receive pliers or a similar tool. The tubular member is supposed to fit into a conduit made up, as usual, of the outer layer 13 and the inner layer 14, these being made of a soft metal, usually lead, and when the end is cut off of a conduit and placed up against a conduit-box 15 the thimble or tubular portion 10 of the coupling is screwed down into the conduit by means of the pliers or by hand, and the thread 11 will fit, and force slightly apart, the meeting points of the coils of the inner layer 14 of the conduit and become locked, in a way, against accidental removal or displacement.

I have found that when screwing up a stiff rigid thimble of this sort in the yielding structure of the conduit the spreading of the members of the conduit grip the threads 11 hard enough to make it difficult to remove the coupling by force. Of course it will be understood that these members can be used on the end of a conduit by simply screwing it into the conduit and having it act as a bushing to give a smooth edge, which is required by the usual underwriter's regulation.

In Fig. 3 I show the device formed with the tubular member 10 being elongated and provided, as before, with the screw-thread 11, the apparatus being in this instance shown as cast. A central flange 17 is installed in this structure to receive a proper tool and to also act as a bearing on each side for the close fitting of the conduit, this structure forming a coupling between two ends of conduits and forming a joint that is very tight and that will not come apart and requires no outside fitting to go over the joint to keep the ends of the conduit together.

Having thus described my invention, what I claim is—

1. In combination with an electrical conduit having a lining wound in helical convolutions with a slight space between the windings, of a device comprising a rigid metallic tubular member to enter the conduit and having an external thread to enter the spaces between the windings of the conduit and arranged to partly spread the windings longitudinally and be locked therein, and having a flange for the reception of a tool.

2. In combination with an electrical conduit having a lining wound in helical convolutions, of a tubular metallic member having a thread to enter the juncture of the windings and arranged to part the windings longitudinally by its entrance and be locked therein, the member having a flange adapted to receive a tool.

3. In combination with an electrical conduit having a lining wound in helical convolutions, of a tubular metallic member having a raised helical thread on its periphery to enter between the convolutions of the lining to spread them apart longitudinally and be
5 held thereby, the tubular member being turned over to form a flange for the reception of a toot.

In testimony that I claim the foregoing I have hereunto set my hand this 24th day of November, 1906.

CHARLES A. FREEMAN.

Witnesses:
 Wm. H. Camfield,
 E. A. Pell.